(12) United States Patent
Stahl

(10) Patent No.: US 8,220,416 B1
(45) Date of Patent: Jul. 17, 2012

(54) ENCLOSURE SYSTEM AND METHOD FOR CONFINING A PET IN THE PASSENGER SEAT OF AN AUTOMOBILE

(76) Inventor: Ira R. Stahl, Willow Grove, PA (US)

( * ) Notice: Subject to any disclaimer, the term of this patent is extended or adjusted under 35 U.S.C. 154(b) by 310 days.

(21) Appl. No.: 12/393,128

(22) Filed: Feb. 26, 2009

(51) Int. Cl.
*A01K 1/00* (2006.01)
*B62D 33/04* (2006.01)

(52) U.S. Cl. ..................................... 119/496; 296/24.31

(58) Field of Classification Search ................. 119/28.5, 119/771, 452, 453, 482, 496, 497; 296/54.4, 296/24.43, 24.46, 24.31; 280/749, 748
See application file for complete search history.

(56) References Cited

U.S. PATENT DOCUMENTS

| | | | | |
|---|---|---|---|---|
| 3,094,354 | A | * | 6/1963 | Bernier ......................... 297/112 |
| 3,169,781 | A | * | 2/1965 | Abruzzino ..................... 280/749 |
| 3,525,535 | A | * | 8/1970 | Kobori .......................... 280/749 |
| 3,655,849 | A | * | 4/1972 | Hayashi ........................ 264/515 |
| 3,797,462 | A | * | 3/1974 | Davis ............................ 119/771 |
| 3,948,554 | A | * | 4/1976 | Barbee .......................... 296/97.6 |
| 4,512,286 | A | | 4/1985 | Rux |
| 4,924,814 | A | | 5/1990 | Beaudet |
| 4,943,105 | A | | 7/1990 | Kacar et al. |
| 5,133,294 | A | | 7/1992 | Reid |
| 5,474,329 | A | * | 12/1995 | Wade et al. .................... 280/749 |
| 5,785,003 | A | | 7/1998 | Jacobson et al. |
| 5,848,817 | A | * | 12/1998 | Niehaus ....................... 296/24.46 |
| 6,079,370 | A | * | 6/2000 | Al-Birmani et al. .......... 119/771 |
| 6,250,700 | B1 | * | 6/2001 | Traxler ........................ 296/24.46 |
| 6,318,611 | B1 | * | 11/2001 | Alexander ..................... 224/275 |
| 6,502,859 | B1 | * | 1/2003 | Svetlik .......................... 280/749 |
| 6,742,837 | B1 | * | 6/2004 | Alexander ................. 297/188.21 |
| 6,907,842 | B2 | * | 6/2005 | Godshaw ...................... 119/28.5 |
| 7,195,297 | B2 | * | 3/2007 | Murray et al. ................ 296/24.4 |
| 7,537,279 | B2 | * | 5/2009 | Pudney ..................... 297/188.01 |
| 7,669,907 | B2 | * | 3/2010 | Spater et al. ................ 296/24.46 |
| 7,717,484 | B2 | * | 5/2010 | Parle et al. .................... 296/24.4 |
| 2006/0103155 | A1 | * | 5/2006 | Spater et al. ............... 296/24.46 |

* cited by examiner

*Primary Examiner* — Kristen C Hayes
(74) *Attorney, Agent, or Firm* — LaMorte & Associates, P.C.

(57) ABSTRACT

A confinement system and method for confining a pet to a passenger seat inside a vehicle. A first net is suspended in front of the seating surface of the passenger seat. A second net is suspended along the side of the passenger seat between the backrest of the seat and the first net. The first net and second net confine the front and inside edges of the passenger seat. The backrest of the seat and the door of the automobile confine the rear and outside edge of the passenger seat. The result is a confined space centered on the passenger seat. A pet is placed inside the confined space. The pet is prevented from falling off the passenger seat while the automobile is moving by the confinement features.

14 Claims, 4 Drawing Sheets

ENCLOSURE SYSTEM AND METHOD FOR CONFINING A PET IN THE PASSENGER SEAT OF AN AUTOMOBILE

BACKGROUND OF THE INVENTION

1. Field of the Invention

In general, the present invention relates to enclosure systems for constraining the movements of a pet while traveling inside an automobile. More particularly, the present invention relates to erectable barriers for the passenger seats of a vehicle that are intended to limit the area in which a pet can move freely.

2. Prior Art Description

Many people own pets and occasionally have to travel with those pets in an automobile. For instance, pet owners often drive their pets to a vet. Small pets, such as any pet smaller than a cat, can be placed in a traveling cage. The cage can then be placed onto any seat inside a vehicle. However, large pets, such as dogs, are often too heavy to carry in a cage and/or require a cage too large to fit into an automobile. Consequently, larger pets are often placed into a vehicle without any constraints.

It will be understood that traveling in an automobile with an unconstrained pet is dangerous to both the pet and the driver of the vehicle. An unconstrained pet can climb or jump into the driver's seat and disrupt the driver by impairing the driver's vision or obstructing the driver's movements. Likewise, a pet can easily fall from a seat and become injured as the vehicle accelerates, decelerates, and turns. It is for these reasons that pet restraints for vehicle seats have been developed.

The prior art is replete with restraints for holding a pet in a safe position inside a vehicle. Many such prior art systems consist of a leash and an open-topped box. The box is placed on the seat of a vehicle. The pet is placed in the box and the leash holds the pet in the box. The box is intended to protect the vehicle seat from the claws and excrement contamination from the pet. The box also protects the pet by preventing the pet from sliding off the seat. Such prior art pet constraint systems are exemplified by U.S. Pat. No. 5,133,294 to Reid, entitled Pet Carrier For Vehicles, U.S. Pat. No. 4,512,286 to Rux, entitled Pet Seat For Automobiles; and U.S. Pat. No. 5,785,003 to Jacobson, entitled Pet Carrier For Vehicles.

One problem associated with box-and-leash constraint systems is that the box must be small enough to fit in the vehicle. As such, it only works with small pets that fit comfortably into the box. Another problem is that the pet may climb out of the box and can become choked or entangled by the leash. Yet another problem is that box-and-leash constraint systems can only hold a single pet at a time.

For larger dogs and/or multiple pets, constraint systems have been developed that restrain the pet, or pets, to the back seat of the vehicle. Such prior art constraint systems erect a barrier between the front seats and the backseats of the vehicle so that a pet cannot climb forward into the front seats. The barrier is positioned at the forward edge of the backseats so that the pet cannot fall off the back seat and into the foot well in front of the back seats. Such prior art constraint systems are exemplified by U.S. Pat. No. 4,924,814 to Beaudet, entitled Pet Restrainer For Passenger Vehicles, and U.S. Pat. No. 4,943,105 to Kacar, entitled Automobile Pet Seat And Cargo Carrier.

Many problems are associated with back seat constraint systems. For instance, a vehicle must have an empty backseat in order to use the system. Many vehicles do not have backseats or have backseats occupied by child seats and the like. Furthermore, backseat constraint systems require the backseats to be bench seats. Many vehicles do not use bench seats. Backseat constraint systems also lack restraints that prevent a pet from falling across the backseat as a vehicle turns. Lastly, backseat constraint systems often obscure the rearward vision of a driver looking through a rearview mirror.

A need therefore exists for a pet constraint system that does not require a leash, does not confine an animal to a small box and does not require an open bench backseat. A need also exists for a pet constraint system that can be used with a wide variety of pets, is low cost and easy to both install and remove. These needs are met by the present invention as described and claimed below.

SUMMARY OF THE INVENTION

The present invention is a confinement system and method for confining a pet to a passenger seat inside a vehicle. A first net is suspended in front of the seating surface of the passenger seat. A second net is suspended along the side of the passenger seat between the backrest of the seat and the first net. The first net and second net confine the front and inside edges of the passenger seat. The backrest of the seat and the door of the automobile confine the rear and outside edge of the passenger seat. The result is a confined space centered on the passenger seat.

A pet is placed inside the vehicle on the passenger seat and inside the confined space. The pet is prevented from falling off the passenger seat while the automobile is moving by the confinement features.

The nets are suspended between the frame of the passenger seat and the sun visor assembly over the passenger seat, therein providing a support system for the net that is resilient and safe for a pet, while being easy to both install and remove.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention enclosure system can be installed in most any seat inside all types of vehicles, the embodiment illustrated shows the enclosure system installed in the front passenger seat of a sedan automobile. This embodiment is selected in order to set forth the best mode contemplated for the invention. The illustrated embodiments, however, are merely exemplary and should not be considered a limitation when interpreting the scope of the appended claims.

Figure 1:
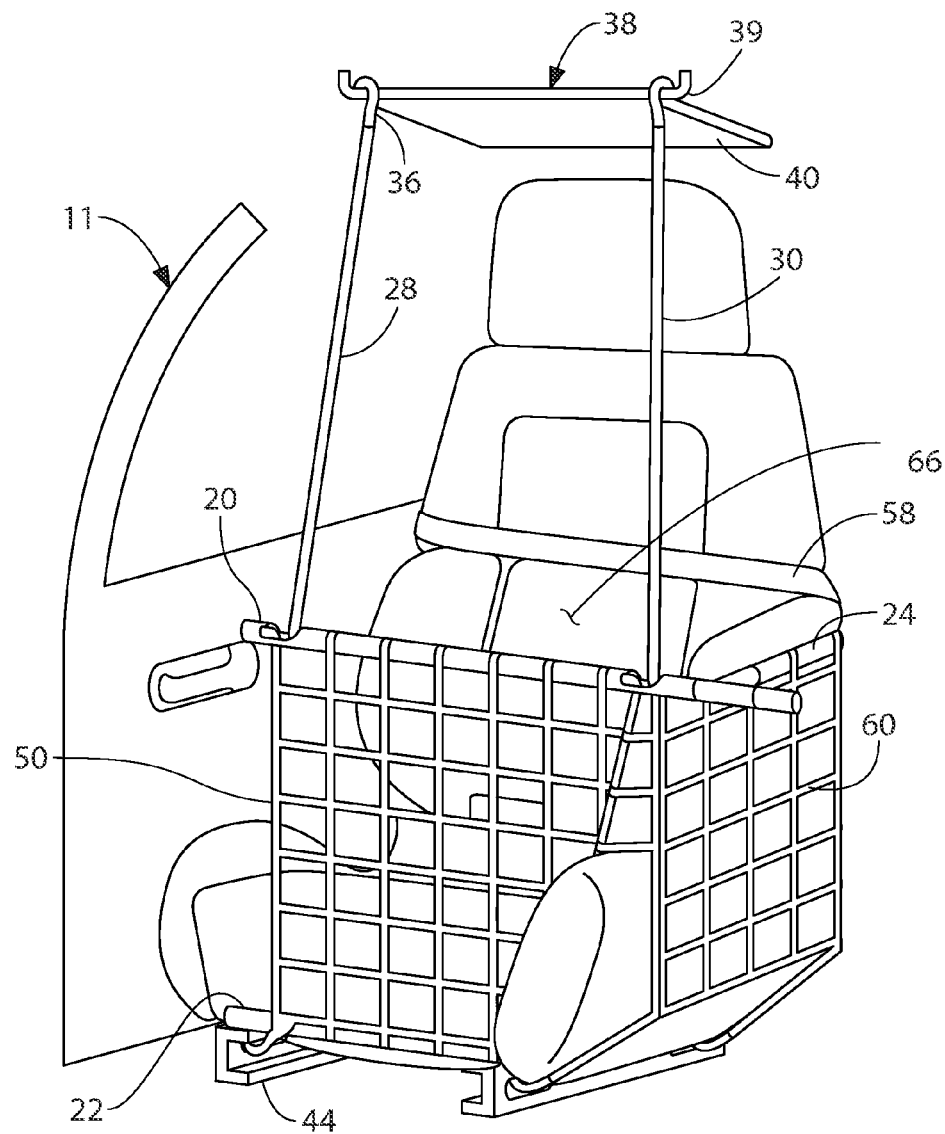
FIG. 1 is a perspective view of an exemplary embodiment of an enclosure system installed in the passenger seat of a vehicle.
Figure 2:
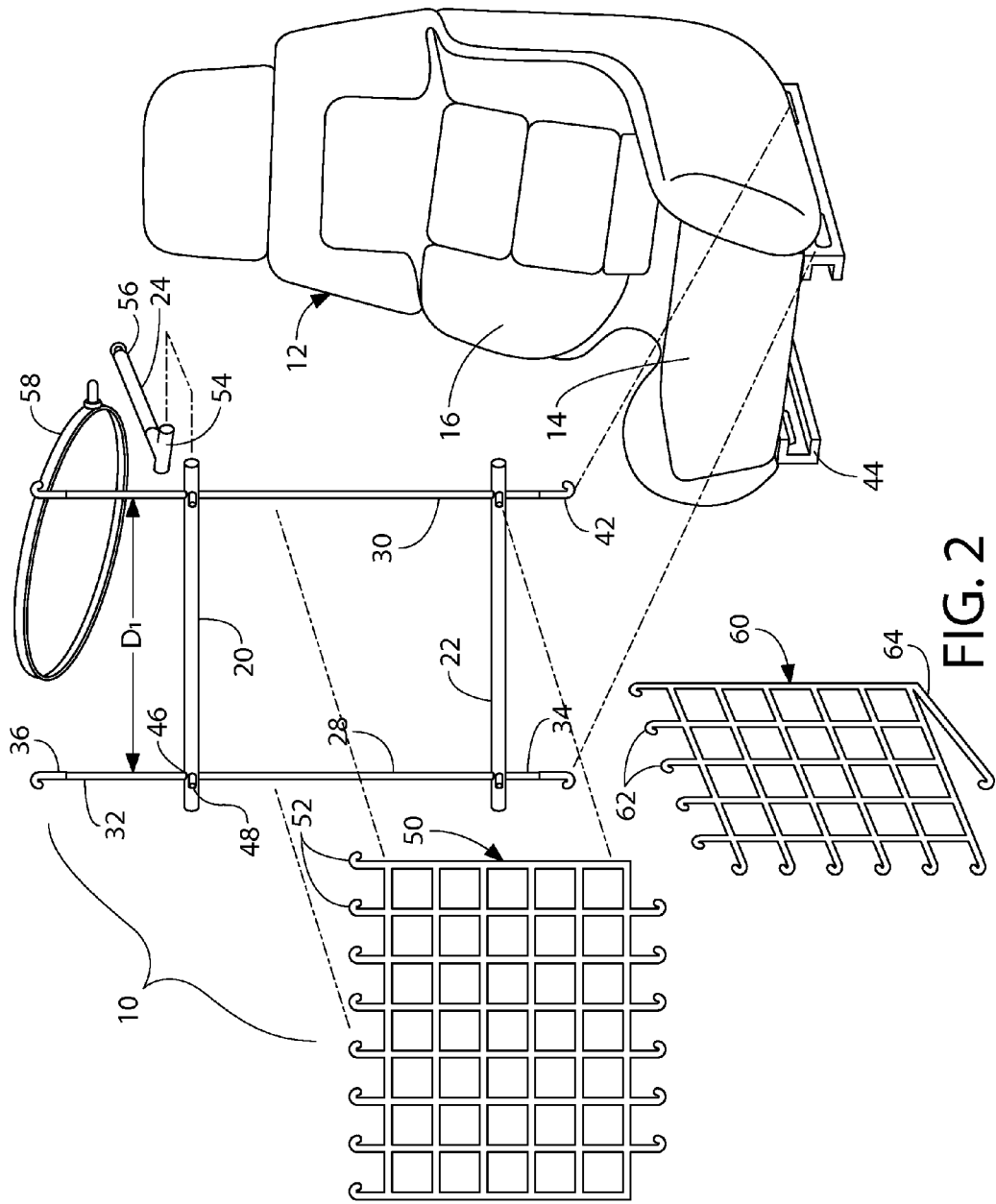
FIG. 2 is an exploded view of the enclosure system.

Referring to FIG. 1 and FIG. 2, a first embodiment of the present invention enclosure system 10 is shown. The purpose of the enclosure system 10 is to confine a pet to the seating surface 14 of a passenger seat 12 inside a vehicle 11. The elected embodiment shows a front passenger seat of a vehicle. Ordinarily, a passenger seat 12 inside a vehicle 11 is confined on two sides. The backrest 16 of the passenger seat 12 prevents any movement off the rear of the seating surface 14. Likewise, the door next to the passenger seat 12 is typically close enough to prevent any lateral movement off the passenger seat 12 in the direction of the door. The present invention enclosure system 10 provides constraints for the front of the passenger seat 12 and the side of the passenger seat 12 that faces into the vehicle 11. In this manner, the seating surface 14 of the passenger seat 12 will be enclosed along all four of its side surfaces. A pet can then be placed onto the seating surface 14, wherein the pet will be confined to the area of the seating surface 14. The seating surface 14 of a passenger seat 12 is sized to receive a full-grown human. As such, the area dedicated for such a human is typically large enough to comfortably hold even a large dog.

Three rigid mounting bars 20, 22, 24 are provided. The three mounting bars include a front top mounting bar 20, a front bottom mounting bar 22, and a side mounting bar 24. Each of these mounting bars 20, 22, 24 is preferably adjustable in length. Accordingly, each of these mounting bars 20, 22, 24 has a telescoping configuration and an adjustment mechanism for locking the various mounting bars 20, 22, 24 into selected lengths.

Two vertical cords 28, 30 are provided. Each of the vertical cords 28, 30 has a top end 32 and a bottom end 34. The top end 32 of each vertical cord terminates with a top hook connector 36. The top hook connectors 36 engage the sun visor assembly 38 either by connecting to the pivot mounting rods 39 of the assembly 38 or the sun visor flap 40 itself. Regardless, the top ends 32 of each of the vertical cords 28, 30 can be selectively attached to, and detached from, the sun visor assembly 38 using a simple manual manipulation.

The bottom end 34 of each of the vertical cords 28, 30 terminates with a locking hook connector 42. The locking hook connector 42 engages the frame 44 of the passenger seat 12 under the passenger seat 12. It is preferred that the attachment of the bottom ends 34 of the vertical cords 28, 30 to the locking hook connectors 42 be adjustable so that the length of the vertical cords 28, 30 can be selectively altered to the needs of the user.

Holes 46 are formed though the front top mounting bar 20 and the front bottom mounting bar 22. Cord pinch locks 48 are affixed to the mounting bars 20, 22 proximate the holes 46. The vertical cords 28, 30 extend through the holes 46 and are engaged by the pinch locks 48. Accordingly, the vertical positions of both the front top mounting bar 20 and the front bottom mounting bar 22 along the vertical cords 28, 30 can be selectively adjusted. The presence of the front top mounting bar 20 and the front bottom mounting bar 22 space the two vertical cords 28, 30 a predetermined distance D1 apart. The predetermined distance D1 between the vertical cords 28, 30 is preferably at least as large as the width of the front of the seating surface 14.

The top hook connectors 36 at the top ends 32 of the vertical cords 28, 30 are attached to the sun visor assembly 38. The locking hook connectors 42 are attached to the frame 44 of the passenger seat 12 under the passenger seat 12. This holds the vertical cords 28, 30 in a vertical plane or a near vertical plane. The vertical cords 28, 30 are preferably elastic, although they need not be. The vertical cords 28, 30, if elastic, are adjusted to be shorter than is required to reach between the passenger seat frame 44 and the sun visor assembly 38. In this manner, the vertical cords 28, 30 must be stretched to reach between the sun visor assembly 38 and the passenger seat frame 44. This keeps the vertical cords 28, 30 taut when in use.

The front bottom mounting bar 22 is adjusted along the vertical cords 28, 30 until it is positioned at or just above, the level of the seating surface 14. The front top mounting bar 20 is adjusted to a height just below that of the backrest 16 of the passenger seat 12.

A front net 50 is provided. The front net 50 is made from elastic mesh. As such, the front net 50 can be stretched through a range of sizes. Connectors 52 are affixed to the periphery of the front net 50. The connectors 52 engage the front top mounting bar 20 and the front bottom mounting bar 22, therein suspending the front net 50 between the front top mounting bar 20 and the front bottom mounting bar 22. The connectors 53 are preferably Velcro® loops. However, rings, loops and other such structures can also be used.

The front net 50, when suspended between the front mounting bars 20, 22, creates a barrier in the front of the seating surface 14 that prevents a pet from falling forward out of the passenger seat 12.

The side mounting bar 24 has two opposing ends 54, 56. The forward end 54 of the side mounting bar 24 connects to the front top mounting bar 20. This positions the side mounting bar 24 at a perpendicular to the front top mounting bar 20. The rearward end 56 of the side mounting bar 24 is connected to a strap 58 that mounts to the backrest 16 of the passenger seat 12. This holds the side mounting bar 24 level with the horizontal.

A side net 60 is provided. The side net 60 is preferably made from elastic mesh. As such, the side net 60 can be stretched through a range of sizes. Connectors 62 are affixed to the top and front edges of the side net 60. The connectors 62 engage the side mounting bar 24 as well as the front net 50. A hook and strap 64 are sewn to the bottom rearward corner of the side net 60. The hook and strap 64 engage some part of the passenger seat 12, such as the seat cushion, a seatbelt mount or the frame 44 under the seating surface 14. The hook and strap 64 can use a mechanical hook, as is shown, or the hook can be replaced with a Velcro® loop.

The side net 60, when suspended as described, creates a barrier along the side of the passenger seat 12 that prevents a pet from moving laterally out of the passenger seat 12.

When both the side net 60 and the front net 50 are in place, the seating surface 14 of the passenger seat 12 is confined on all four sides. The backrest 16 and car door define two sides. The side net 60 and front net 50 define the other two sides. This creates a confined area 66 into which a dog or other pet can be placed without further constraint.

Since the length and positions of the front top mounting bar 20 and the front bottom mounting bar 22 can be adjusted, and both nets 50, 60 are elastic, the enclosure system 10 can be adjusted to fit any seat from the size of the small bucket seat of a compact car to the large seat of a sedan.

Figure 3:
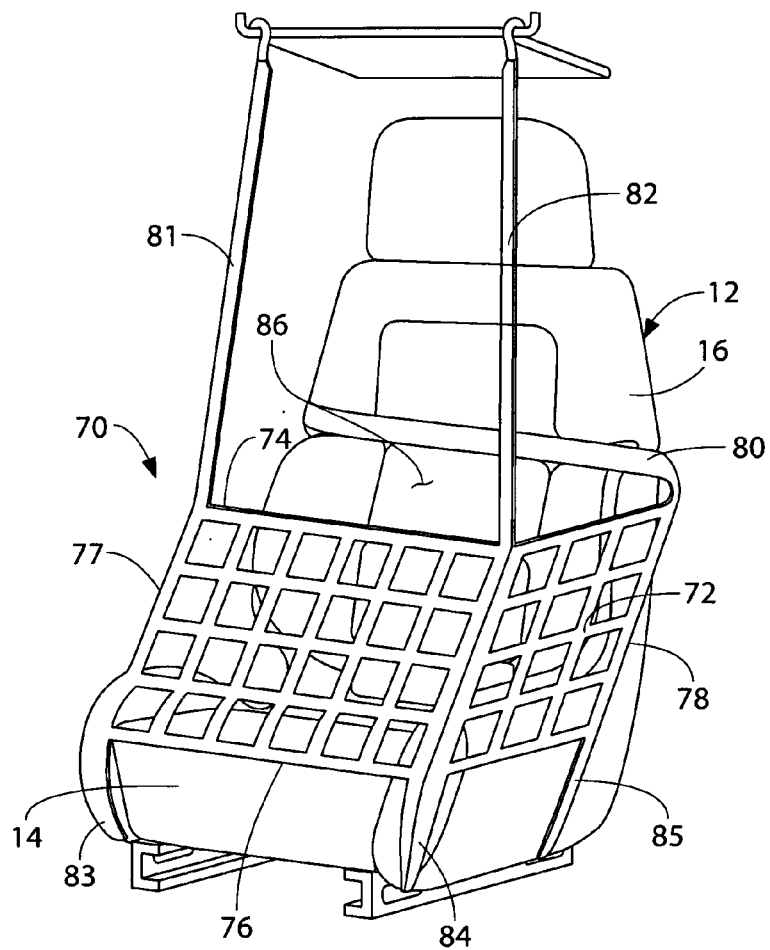
FIG. 3 is a perspective view of an alternate embodiment of an enclosure system installed in the passenger seat of an automobile.

Referring now to FIG. 3, an alternate embodiment of an enclosure system 70 is shown. In this embodiment, no mounting bars are used. Rather, a single length of netting 72 is used. The netting 72 is elastic so it can be stretched to fit many different vehicle seats. The netting 72 has a top edge 74, a bottom edge 76 and two opposing side edges 77, 78.

Three top mounting straps 80, 81, 82 are attached to the top edge 74 of the netting 72. One of the straps attaches to the backrest 16 of the passenger seat 12. The other two mounting straps 81, 82 attach to the sun visor assembly 38 above the passenger seat 12. Such a mounting configuration causes a general bend in the netting 72 that enables the netting 72 to curve from the side of the seating surface 14 to the front of the seating surface 14.

Likewise, three mounting straps 83, 84, 85 are attached to the bottom edge 76 of the netting 72. All three bottom mounting straps 83, 84, 85 attach to the frame 44 under the passenger seat 12.

When the netting 72 is mounted in place, the seating surface 14 of the passenger seat 12 is confined an all four sides. The backrest 16 and car door (not shown) define two sides. The curved path of the netting 72 defines the other two sides. This creates a confined area 86 into which a dog or other pet can be placed without further constraint.

Figure 4:
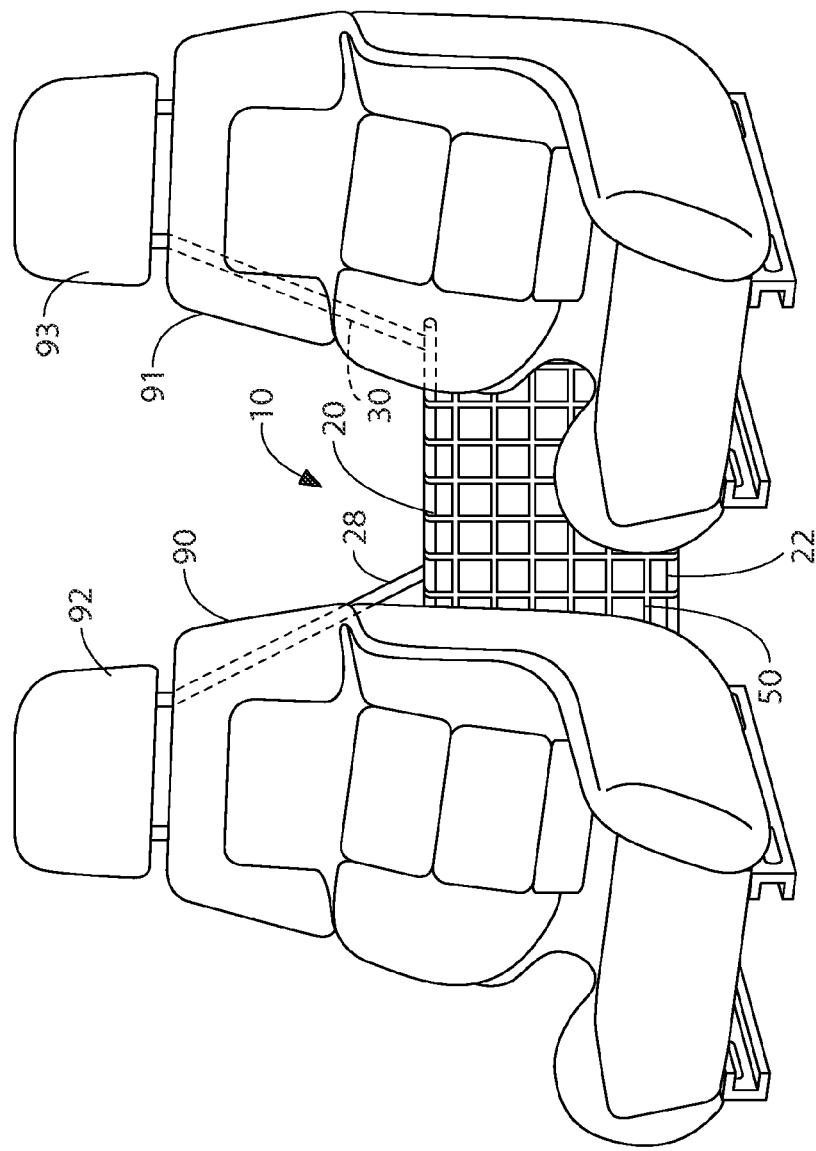
FIG. 4 is a perspective view of an alternate embodiment of an enclosure system installed in between seats of an automobile.

Referring to FIG. 4 in conjunction with FIG. 2, the enclosure system 10 previously shown in FIG. 1 is again shown in an alternate application. Using the enclosure system 10, the space between to seats 90, 91 can be obstructed. The vertical cords 28, 30 are attached between the frame under each seat 90, 91 and the headrests 92, 93 for each of the seats 90, 91. The bottom front mounting bar 22 is moved along the vertical cords 28, 30 until it rests near the floor of the vehicle. The front top mounting bar 20 is positioned along the vertical cords 28, 30 near the height of the armrests. The front net 50 is then connected to the front top mounting bar 20 and the bottom front mounting bar 22. This creates a netted obstruction that blocks the open space between the seats 90, 91.

Consequently, any animal in the back seat of the vehicle would be incapable of traveling to the front seats through the space between the front seats. This is a highly effective way to maintain larger dogs in the rear seat of a vehicle.

It will be understood that the embodiments of the present invention that are illustrated and described are merely exemplary and that a person skilled in the art can make many variations to those embodiments. For instance, the netting can be replaced with full panels of elastic material. Likewise, additional straps can be attached to the netting that anchor the netting to other points in the vehicle. All such embodiments are intended to be included within the scope of the present invention as defined by the claims.

What is claimed is:

1. A method of confining a pet, said method comprising the steps of:
    providing a vehicle having a sun visor assembly and a passenger seat with a backrest and a seating surface
    extending a first cord between the passenger seat and the sun visor assembly by connecting said first cord to the passenger seat and the sun visor assembly with hook connectors;
    extending a second cord between the passenger seat and the sun visor assembly by connecting said second cord to the passenger seat and the sun visor assembly with hook connectors;
    suspending a first net section in front of the seating surface between said first cord and said second cord;
    suspending a second net section in between the backrest and said first net;
    wherein when a pet is placed on the seating surface, the pet is confined on the seating surface in part by said first net section and said second net section.

2. The method according to claim 1, wherein said step of suspending a first net section further includes extending at least one rigid element between said first cord and said second cord to create a predetermined distance between said first cord and said second cord, and connecting part of said first net to said at least one rigid element.

3. The method according to claim 2, wherein said step of suspending said second net section includes suspending a rigid side element between the backrest and said at least one rigid element and coupling said second net section to said rigid element.

4. The method according to claim 3, wherein the seating surface has a predetermined length and said method further includes the step of adjusting said rigid element to be at least as long as said predetermined length.

5. The method according to claim 2, wherein the seating surface has a predetermined width and said method further including the step of adjusting said predetermined distance between said first cord and said second cord to be at least as large as said predetermined width.

6. The method according to claim 1, wherein said first net section is elastic.

7. The method according to claim 1 further including the step of tensioning first cord and said second cord.

8. A method of positioning confinement barriers, said method comprising:
    providing a vehicle having a sun visor assembly and a seat, wherein said seat has a backrest and a seating surface;
    extending cords between said sun visor assembly and said seat, wherein each of said cords terminates with a top hook connector and a bottom hook connector, and wherein said top hook connector is coupled to the sun visor assembly and the bottom clip is coupled to said seat;
    spacing said cords a predetermined distance apart by suspending at least one rigid element between said cords;
    suspending at least one net between said cords and said at least one rigid element.

9. The method according to claim 8, wherein said at least one rigid element includes a top element that extends horizontally between said cords at an elevation higher than that of said seating surface.

10. The method according to claim 9, further including the step of suspending a rigid side element between said backrest and said top element.

11. The method according to claim 10, further including the step of suspending a side net between said rigid side element and the seat.

12. The method according to claim 8, wherein said cords are elastic.

13. The method according to claim 8, further including the step of tensioning said cords.

14. A method of confining a pet, said method comprising the steps of:
    providing a vehicle having a sun visor assembly and a passenger seat with a backrest and a seating surface;
    extending a first cord between the passenger seat and the sun visor assembly;
    extending a second cord between the passenger seat and the sun visor assembly;
    suspending a first net section in front of the seating surface between said first cord and said second cord by extending at least one rigid element between said first cord and said second cord to create a predetermined distance between said first cord and said second cord, and connecting part of said first net to said at least one rigid element;
    suspending a second net section in between the backrest and said first net by suspending a rigid side element between the backrest and said at least one rigid element and coupling said second net section to said rigid element;
    wherein when a pet is placed on the seating surface, the pet is confined on the seating surface in part by said first net section and said second net section.

\* \* \* \* \*